US008621281B2

(12) United States Patent
Kan

(10) Patent No.: US 8,621,281 B2
(45) Date of Patent: Dec. 31, 2013

(54) INFORMATION PROCESSING APPARATUS AND CONTROL METHOD

(75) Inventor: Ryuji Kan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 807 days.

(21) Appl. No.: 12/635,896

(22) Filed: Dec. 11, 2009

(65) Prior Publication Data

US 2010/0095156 A1    Apr. 15, 2010

Related U.S. Application Data

(63) Continuation of application No. PCT/JP2007/000647, filed on Jun. 20, 2007.

(51) Int. Cl.
*G06F 11/00*    (2006.01)

(52) U.S. Cl.
USPC ............................ 714/37; 714/25; 714/35

(58) Field of Classification Search
USPC ................................. 714/35, 46, 10
See application file for complete search history.

(56) References Cited

U.S. PATENT DOCUMENTS

| | | | |
|---|---|---|---|
| 5,180,402 A | 1/1993 | Kubota et al. | |
| 5,872,910 A | 2/1999 | Kuslak et al. | |
| 6,751,756 B1 * | 6/2004 | Hartnett et al. | 714/54 |
| 7,222,064 B1 * | 5/2007 | Sollom et al. | 703/26 |
| 7,320,114 B1 * | 1/2008 | Jain et al. | 716/106 |
| 7,343,478 B2 | 3/2008 | Kan et al. | |
| 7,346,814 B2 * | 3/2008 | Tsai et al. | 714/55 |
| 2004/0034820 A1 | 2/2004 | Soltis, Jr. et al. | |
| 2005/0138485 A1 * | 6/2005 | Osecky et al. | 714/48 |
| 2007/0011599 A1 | 1/2007 | Levitan | |
| 2008/0155328 A1 * | 6/2008 | Chakraborty | 714/32 |

FOREIGN PATENT DOCUMENTS

| | | |
|---|---|---|
| JP | 58-43044 | 3/1983 |
| JP | 59-200349 | 11/1984 |
| JP | 61-267840 | 11/1986 |
| JP | 63-290423 | 11/1988 |
| JP | 4-109340 | 4/1992 |
| JP | 2007-87108 | 4/2007 |

OTHER PUBLICATIONS

Extended European Search Report dated Feb. 13, 2012 issued in corresponding European Patent Application No. 07790173.4.
International Search Report for PCT/JP2007/000647, mailed Aug. 21, 2007.

* cited by examiner

*Primary Examiner* — Sarai Butler
(74) *Attorney, Agent, or Firm* — Staas & Halsey LLP

(57) ABSTRACT

A processing apparatus includes: first and second register files, the latter holding a part of data in the former; an operation unit to operate on data in the second register file and to output data; an instruction unit to issue a write instruction to write, to both register files, the output data and an error detection code for it, and first and second occurrence instructions; a first control unit to issue a first generation instruction when receiving the write instruction and the first occurrence instructions; and a first generation unit to generate a first simulated fault data to output it to the first register file when receiving the first generation instruction, and to output the output data and the error detection code to the first register file in absence of the first generation instruction. Similar second control and generation units are also provided mutatis mutandis.

14 Claims, 6 Drawing Sheets

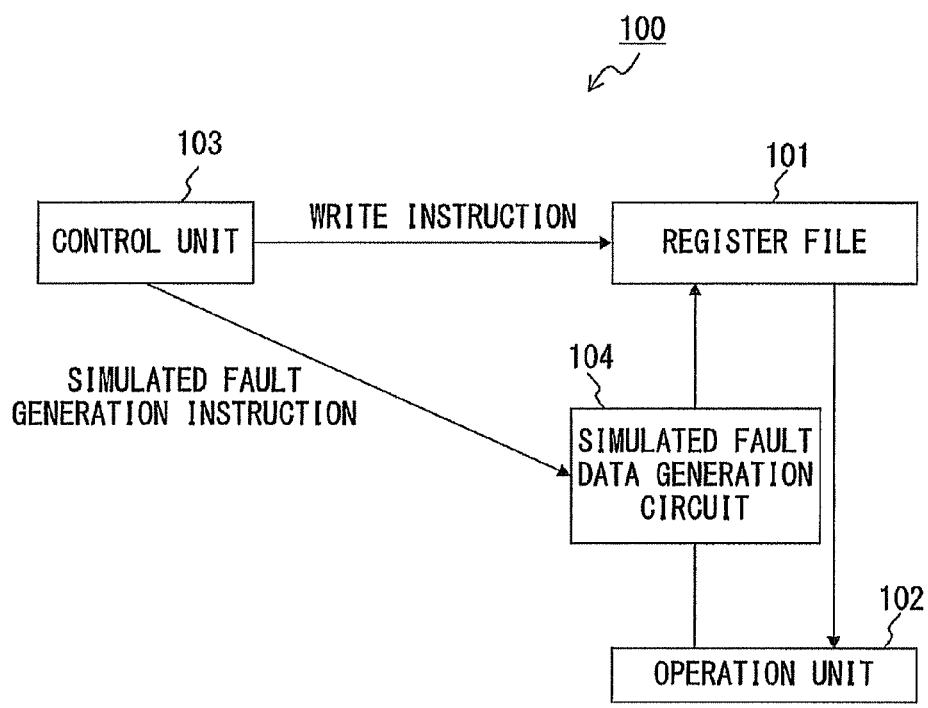
F I G. 1

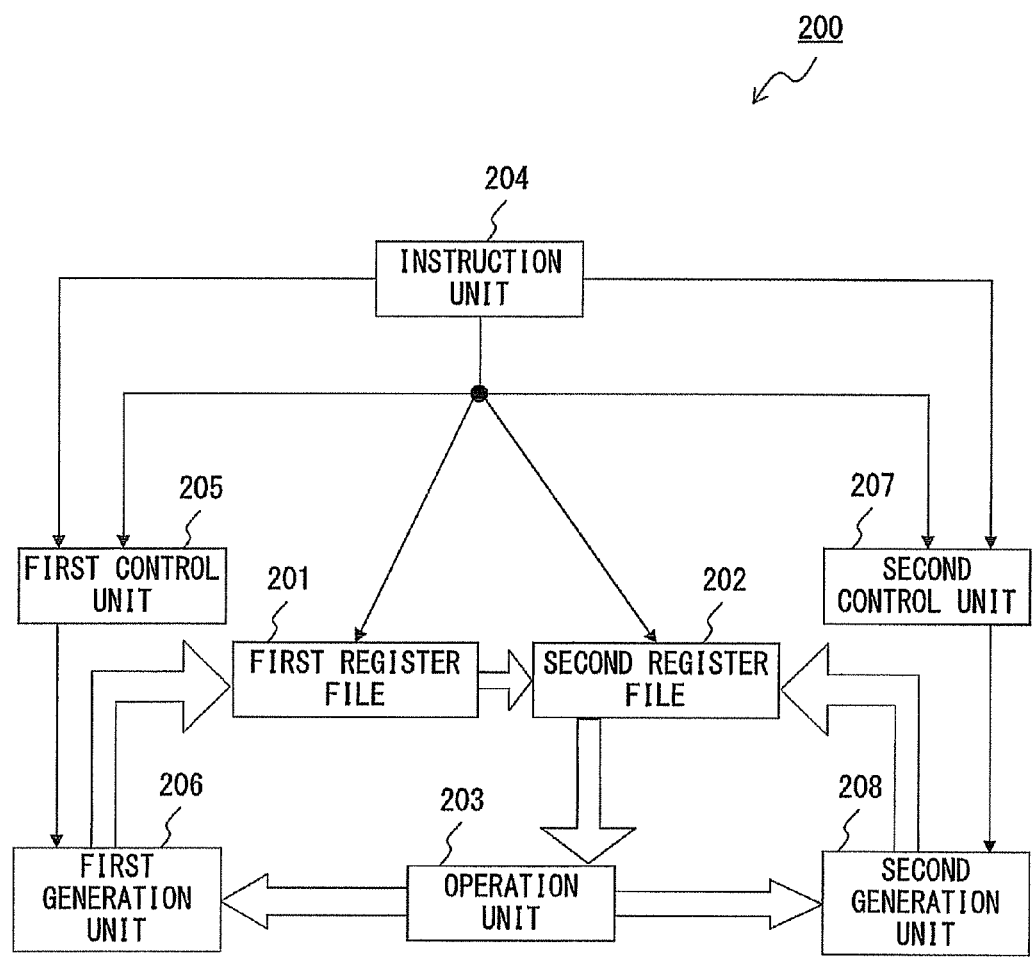
F I G. 2

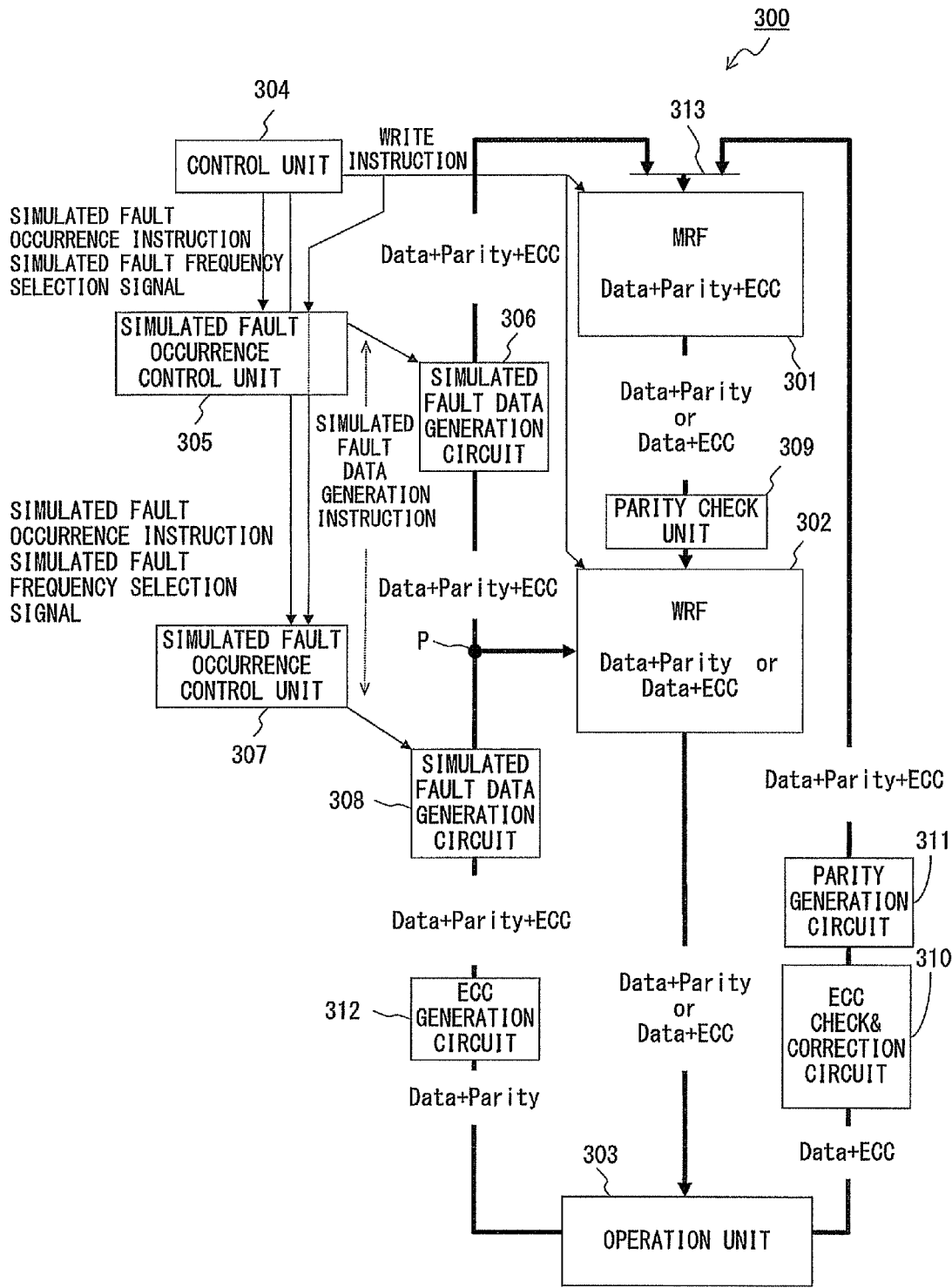
F I G. 3

INFORMATION PROCESSING APPARATUS AND CONTROL METHOD

CROSS-REFERENCE TO RELATED APPLICATION

This application is a continuation of PCT application PCT/JP2007/000647, which was filed on Jun. 20, 2007, and the entire contents of which are incorporated herein by reference.

FIELD

The present invention relates to the technology of simulating an occurrence of a fault.

BACKGROUND

There are well-known mechanisms for detecting an error and various mechanisms for automatically correcting the detected error and recovering from the error when a data error occurs owing to an occurrence of a fault in a register file etc. in a common information processing apparatus. In a checking process in making a prototype of an information processing apparatus and in manufacturing a practical information processing apparatus, it is necessary to confirm that a mechanism for detecting the error using parity, a mechanism for detecting and correcting the error using an error-correcting code (ECC), a mechanism for automatically rerunning an instruction by hardware in response to the detection of the error, a mechanism for rerunning a program by a software interrupt in response to the detection of the error, etc. correctly function individually. That is, it is necessary to debug these mechanisms. In the descriptions below, these mechanisms to be debugged are generally called "mechanisms to be debugged". To debug the mechanisms to be debugged, it is necessary to embed a circuit for generating a pseudo fault (that is called a "simulated fault" below) to simulate an occurrence of a fault in a central processing unit (CPU) in an information processing apparatus in advance.

FIG. 1 is a functional block diagram illustrating the configuration of a conventional central processing unit in which a circuit for generating a simulated fault is embedded. FIG. 1 is a view obtained by extracting a portion relating to an occurrence of a simulated fault from among components configuring a CPU 100.

In a normal operation, an operation unit 102 performs an operation using data read from a register file 101, and writes back an operation result to the register file 101. A control unit 103 controls the entire execution of the operation, and the control includes, for example, an instruction to write data to the register file 101.

In addition, the CPU 100 includes a mechanism to be debugged (not illustrated in the attached drawings) realized by hardware, firmware, and/or software, and a simulated fault data generation circuit 104. The control unit 103 also controls switching between a normal mode in which the normal operation is performed as described above and a debug mode for debugging the mechanism to be debugged.

The simulated fault data generation circuit 104 is provided in the path from the operation unit 102 to the register file 101. In the normal mode, the operation result output from the operation unit 102 is input to the simulated fault data generation circuit 104, and the simulated fault data generation circuit 104 outputs the input as is to the register file 101.

On the other hand, in the debug mode, the control unit 103 instructs the simulated fault data generation circuit 104 to generate a simulated fault. Then, according to the simulated fault generation instruction, the simulated fault data generation circuit 104 generates simulated fault data from the operation result input from the operation unit 102 and outputs it to the register file 101. Typical simulated fault data is data obtained by inverting the bit value(s) of one or more bits in the input operation result.

In the above-mentioned operation, since the operation result is converted into simulated fault data and then written to the register file 101, an occurrence of a fault is simulated. The thus simulated fault, that is, a pseudo fault is used in debugging a mechanism to be debugged.

The well-known documents about the generation of a simulated fault include, for example, patent documents 1 through 4.

The device according to the patent document 1 includes a syndrome bit setting unit capable of setting an arbitrary syndrome bit, and a selector for selecting one of the output from a normally used syndrome bit producing circuit and the output from the syndrome bit setting unit. The output of the selector is decoded by a syndrome bit decoding circuit, and a data correcting circuit obtains the exclusive disjunction (XOR) of a decoding result and the data stored in a register. Therefore, data in which an error has been produced in an arbitrary bit is output from the data correcting circuit by the selector selecting the syndrome bit setting unit.

The circuit according to the patent document 2 includes a control circuit as a combination of a counter and a decoder so that all patterns of errors correctable by the error correction circuit are settable. The control circuit outputs error generation control bits corresponding to respective bits of data and ECC. A simulated fault generating circuit computes the XOR between each of the error generation control bits and a corresponding bit in the data or a corresponding bit in the ECC. Therefore, it becomes possible to generate simulated faults of all patterns of errors correctable by the error correction circuit.

According to a circuit of the patent document 3, in a central processing unit in a microprogram control system, a fault generation flip-flop is set for only one clock and a fault is notified if a fault instruction flip-flop is set and at least one of a mode flip-flop indicating that fault generation is limited to only once and a history flip-flop indicating that a fault has already been generated is not set when a time signal indicating the timing of generating a simulated fault indicates the logic level of "1".

The circuit according to the patent document 4 is capable of setting whether or not to generate a simulated fault for a register in which a fault is to be detected, correspondingly to each of a plurality of parity check circuits for performing a parity check on a value of a corresponding register. If a setting is made to generate a simulated fault, an XOR circuit inverts a parity bit of a target register in which a fault is to be detected.

As described above, there are various known techniques of generating a simulated fault. On the other hand, a CPU provided with a plurality of register files to read data in a high speed from a large register file having a number of entries is also known.

For example, the device according to the patent document 5 includes a master register file (MRF) having a plurality of register windows, a current window register (CWR) holding a copy of data of the current register window indicated by a current window pointer (CWP), a current window replace buffer (CRB) pre-reading and holding data of a register window to be next held in the CWR, and an operation unit for performing an operation after reading data from the CWR or the CRB.

However, there is the problem that a mechanism to be debugged cannot be sufficiently debugged if a simulated fault is generated in a conventional method in a CPU having a plurality of register files. For example, assume that the register file 101 in FIG. 1 is configured by a large register file (hereinafter referred to as an MRF short for a master register file) having a number of entries, and a small register file (hereinafter referred to as an WRF short for a working register file) that copies the data of only a part of the entries in the MRF and holds the data. Also assume that the operation unit 102 reads data from the WRF, and the operation result is written back to both MRF and WRF.

In this case, with the configuration in FIG. 1, the same simulated fault data output from the simulated fault data generation circuit 104 is written to both MRF and WRF. Therefore, the patterns that can be simulated by the simulated fault data generation circuit 104 are only those in which the same faults simultaneously occur in both MRF and WRF configuring the register file 101.

That is, with the conventional configuration in FIG. 1, it is not possible to simulate a fault occurring only in the MRF independent of the WRF and to individually debug a mechanism to be debugged which is provided for the MRF. However, it is important to simulate a fault occurring only in the MRF and to perform debugging to confirm whether or not the fault is correctly detected and the data is correctly corrected. Therefore, the function to simulate the fault occurring only in the MRF is demanded.

One of the reason is that it is possible to recover the WRF from the MRF, but not possible to recover the MRF from the WRF. Even if a fault occurs in the WRF, the data in the WRF can be easily recovered by re-copying the data from the MRF as long as the MRF is in the normal state. However, if a fault occurs in the MRF, the data in the MRF cannot be recovered from the WRF because only apart of the data held by the MRF is stored in the WRF. Therefore, for example, it is necessary to take a measure to recover data in the MRF by reading data from cache memory or main memory etc. That is, since a fault occurring in the MRF has a larger influence than a fault occurring in the WRF, the function of simulating a fault occurring only in the MRF is important.

Another reason is that since the MRF is larger than the WRF, the frequency that soft errors occur in the MRF because of a neutron etc. is higher than the frequency that soft errors occur in the WRF. Thus, the practical frequencies of occurrences of faults are different. Accordingly, the function of simulating a practical pattern in which a fault occurs in the MRF but not in the WRF is demanded.

[Patent Document 1] Japanese Laid-open Patent Publication No. 58-043044
[Patent Document 2] Japanese Laid-open Patent Publication No. 59-200349
[Patent Document 3] Japanese Laid-open Patent Publication No. 61-267840
[Patent Document 4] Japanese Laid-open Patent Publication No. 4-109340
[Patent Document 5] Japanese Laid-open Patent Publication No. 2007-087108

SUMMARY

According to an aspect of the invention, a processing apparatus includes first and second register files, an operation unit, an instruction unit, first and second control units, and first and second generation units.

The second register file is configured to hold a part of data held by the first register file. The operation unit is configured to perform an operation using data in the second register file, and to output an operation result as output data.

The instruction unit is configured to issue a write instruction to write the output data and an error detection code for detection of an error in the output data to both the first and second register files, and first and second occurrence instructions to generate respective simulated faults in the first and second register files.

The first control unit is configured to issue a first generation instruction upon receipt of the write instruction and the first occurrence instruction. The first generation unit is configured to generate first simulated fault data according to the output data and the error detection code to output the first simulated fault data to the first register file upon receipt of the first generation instruction, and to output the output data and the error detection code to the first register file in absence of the first generation instruction.

The second control unit is configured to issue a second generation instruction upon receipt of the write instruction and the second occurrence instruction. The second generation unit is configured to generate second simulated fault data according to the output data and the error detection code to output the second simulated fault data to the second register file upon receipt of the second generation instruction, and to output the output data and the error detection code to the second register file in absence of the second generation instruction.

BRIEF DESCRIPTION OF DRAWINGS

FIG. 1 is a functional block diagram illustrating a configuration of the conventional CPU in which a circuit for generating a simulated fault is embedded;

FIG. 2 is a functional block diagram illustrating a configuration of the CPU according to the first embodiment;

FIG. 3 is a functional block diagram illustrating a configuration of the CPU according to the second embodiment;

DESCRIPTION OF EMBODIMENTS

Figure 4:
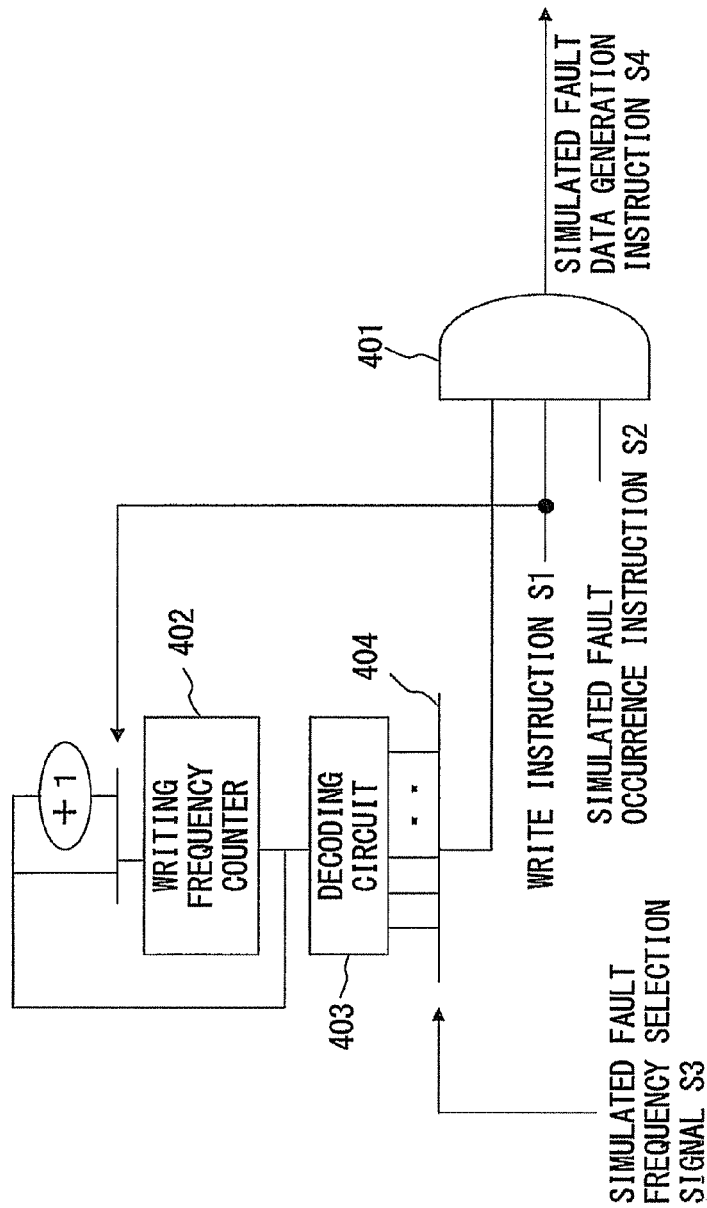
FIG. 4 is a circuit diagram illustrating a specific example of a simulated fault occurrence control unit according to the second embodiment.

An example of an embodiment is described below in detail with reference to the attached drawings.

FIG. 2 is a functional block diagram illustrating a configuration of the CPU according to the first embodiment. In FIG. 2, the arrows in solid lines indicate instructions for control, and the block-shaped arrows indicate the flow of data.

A CPU 200 in FIG. 2 includes a first register file 201, a second register file 202, and an operation unit 203. The first register file 201 has a number of entries and is large. To read data in a high speed from the large first register file 201 to the operation unit 203, the CPU 200 is provided with the second register file 202 for copying a part of the data held by the first register file 201 and holding the copied data. That is, the number of entries of the second register file 202 is smaller than the number of entries of the first register file 201, and the data of only a part of the entries of the first register file 201 is copied to the second register file 202. The operation unit 203 reads data from the second register file 202, performs an operation on the data, and outputs an operation result as output data.

The first and second register files 201 and 202 store data and an error detection code for detection of an error in the data. That is, each entry of the first and second register files 201 and 202 includes data and an error detection code. As the error detection code, as well as parity or a checksum that is capable of detecting an error but incapable of correcting the error, there is also an ECC capable of correcting the error. There are various types of ECCs. Any type of error detection code may be applied to the first and second register files 201 and 202, but parity is adopted in the present embodiment because a circuit for generating and checking parity is simple and small.

In the present embodiment, the operation unit 203 calculates the parity from the operation result, and outputs the parity together with the output data. Although omitted in FIG. 2, the CPU 200 is also provided with an error detection circuit for checking parity and detecting an error. There may be a plurality of error detection circuits. For example, the error detection circuit may be provided for each of the first register file 201, the second register file 202, and the operation unit 203.

The CPU 200 further includes an instruction unit 204, a first control unit 205, a first generation unit 206, a second control unit 207, and a second generation unit 208.

The instruction unit 204 issues a write instruction to write output data output from the operation unit 203 together with parity to both of the first and second register files 201 and 202, a first occurrence instruction to simulate a fault occurring in the first register file 201, and a second occurrence instruction to simulate a fault occurring in the second register file 202. An instruction to simulate a fault is, in other words, an instruction to generate a simulated fault. The instruction unit 204 may further issue other instructions to control the operations of the CPU 200.

When the first control unit 205 receives a write instruction and a first occurrence instruction from the instruction unit 204, it issues a first generation instruction and outputs the first generation instruction to the first generation unit 206. When the first generation unit 206 receives the first generation instruction, it generates a first simulated fault data on the basis of the output data and the parity that are output from the operation unit 203, and outputs the first simulated fault data to the first register file 201. The first simulated fault data is data obtained by inverting one bit or more in the output data and the parity. On the other hand, in the absence of the first generation instruction, the first generation unit 206 outputs the output data and the parity, which are output from the operation unit 203, to the first register file 201 as just they are.

When the second control unit 207 receives the write instruction and the second occurrence instruction from the instruction unit 204, it issues a second generation instruction and outputs the second generation instruction to the second generation unit 208. When the second generation unit 208 receives the second generation instruction, it generates second simulated fault data on the basis of the output data and the parity that are output from the operation unit 203, and outputs the second simulated fault data to the second register file 202. The second simulated fault data is data obtained by inverting one bit or more in the output data and the parity. On the other hand, in the absence of the second generation instruction, the second generation unit 208 outputs the output data and the parity, which are output from the operation unit 203, to the second register file 202 as just they are.

In the present embodiment, the instruction unit 204 also provides the first and second register files 201 and 202 with a write instruction in order to specify the timing of writing data and parity.

The CPU 200 configured as described above operates in two modes as follows.

When a general user uses an information processing apparatus including the CPU 200, the CPU 200 is set in a normal mode in which a normal operation is performed. In the normal mode, the instruction unit 204 issues no first or second generation instruction. Therefore, the output data and the parity output from the operation unit 203 are written to the first and second register files 201 and 202 as they are.

On the other hand, for example, in the in-factory check before the shipment of the CPU 200, it is checked whether or not an error detection circuit not illustrated in the attached drawings correctly functions. That is, the error detection circuit is debugged. For the debugging, it is necessary to generate a simulated fault. Therefore, when the CPU 200 is checked, the CPU 200 is set in a debug mode in which a simulated fault is generated according to a first or a second generation instruction.

In the debug mode, when the instruction unit 204 issues the first occurrence instruction, the first simulated fault data is output to the first register file 201 according to the write instruction. If the instruction unit 204 issues the second occurrence instruction in the debug mode, the second simulated fault data is output to the second register file 202 according to the write instruction. Simulation of a fault in a desired pattern depending on a debugging target is made possible by the instruction unit 204 issuing one of the first and second occurrence instructions or both as necessary in the debug mode. Therefore, it is possible to check whether or not an error detection circuit etc. correctly operates with respect to a fault in a simulated pattern.

Since the CPU 200 in FIG. 2 is provided with two sets of a register file, a control unit, and a generation unit, it is possible to simulate a pattern in which, for example, a fault occurs in the first register file 201 but the second register file 202 is in a normal state.

Next, the second embodiment is described below with reference to FIGS. 3 through 6. The second embodiment is one obtained by adding some additional functions to the first embodiment.

FIG. 3 is a functional block diagram illustrating a configuration of the CPU according to the second embodiment. First, the correspondences between the similar components illustrated in FIGS. 2 and 3 are described below. An MRF 301, a WRF 302, an operation unit 303, a control unit 304, a simulated fault occurrence control unit 305, a simulated fault data generation circuit 306, a simulated fault occurrence control unit 307, and a simulated fault data generation circuit 308 in FIG. 3 respectively correspond to the first register file 201, the second register file 202, the operation unit 203, the instruction unit 204, the first control unit 205, the first generation unit 206, the second control unit 207, and the second generation unit 208 in FIG. 2.

In FIG. 3, the above components similar to those in FIG. 2 are also assigned functions specific to the second embodiment. A CPU 300 further includes a parity check unit 309, an ECC check-correction circuit 310, a parity generation circuit 311, an ECC generation circuit 312, and a selector 313 as unique components of the second embodiment. In the components of the CPU 300, the components such as cache memory etc. not directly related to the present embodiment are omitted in FIG. 3.

Described next in detail are the configuration and the operation of the CPU 300 in FIG. 3.

The MRF 301 is a register file having a number of entries. The MRF 301 uses an 80-bit format including 64-bit data, 8-bit parity, and an 8-bit ECC. That is, each entry of the MRF 301 is formed by 80 bits including data, parity, and an ECC. In the present embodiment, the 64-bit data is divided into 8-bit sections, and 1-bit parity is calculated for each 8-bit data. Therefore, the parity is formed by a total of 8 bits. In the present embodiment, an SECDED (single-error-correct, double-error-detect) ECC is used. The SECDED-ECC for 64-bit data is formed by 8 bits. In the following description, it is assumed for convenience of explanation that the 0th through 63rd bits refer to data, the 64th through 71st bits refer to parity, and the 72nd through 79th bits refer to an ECC.

On the other hand, a 72-bit format including 64-bit data and 8-bit parity is used in the WRF 302. In the WRF 302, it is assumed that the 0th through 63rd bits refer to data, and the 64th through 71st bits refer to parity. The reason why thus different formats are used in the MRF 301 and the WRF 302 is described below.

It is preferable for the MRF 301 to enhance the reliability of data by adding an ECC for correction of an error because the MRF 301 is larger than the WRF 302 and the operation unit 303 and consequently has a higher frequency at which soft errors occur owing to neutrons etc. Addition of an ECC makes it possible to correct a 1-bit intermittent fault occurring in the MRF 301 by the ECC check-correction circuit 310. On the other hand, the addition of an ECC incurs an increase in the size of a circuit. Accordingly, with the balance between the reliability of data and the size of a circuit taken into account, a manner adopted in the present embodiment is such that an ECC is not added and only parity is used in the WRF 302 lower in the frequency of occurrences of soft errors than the MRF 301.

Although the WRF 302 is also a register file having a plurality of entries, the number of entries of the WRF 302 is smaller than the number of entries of the MRF 301. The WRF 302 copies and holds the data and the parity in a part of the entries of the MRF 301. The timing of copying them from the MRF 301 to the WRF 302, the entry of the MRF 301 to be copied, and the correspondence between the entry of the MRF 301 and that of the WRF 302 are specified by the control unit 304.

When an error is detected as described later, the data and the ECC are copied to the WRF 302 from the entry specified in the MRF 301. As described above, since both the parity and the ECC are formed by 8 bits, the same 72-bit entry may be used in two uses of "holding data and parity" and "holding data and an ECC" as necessary. Accordingly, a circuit can be efficiently utilized, thereby preventing the circuit from becoming unnecessarily large.

The parity check unit 309 is provided in the path from the MRF 301 to the WRF 302. When data and parity are copied from the MRF 301 to the WRF 302, a selector not illustrated in the attached drawings and controlled by the control unit 304 selects the 0th through 71st bits, and inputs the data and the parity from the MRF 301 to the parity check unit 309. The parity check unit 309 checks the input data and parity.

If no error is detected in the parity check, the parity check unit 309 outputs the input data and parity to the WRF 302 as they are input. Using the data thus copied to the WRF 302, the operation unit 303 performs an operation.

For more details, the WRF 302 outputs the data and parity to the operation unit 303, and the operation unit 303 checks the parity and performs the operation if it detects no error. The operation result is 64-bit output data. The operation unit 303 also calculates the 8-bit parity corresponding to the output data, and outputs 72 bits formed by the output data and the parity.

In FIG. 3, there are two paths from the operation unit 303 to the MRF 301. The path used in the state in which no error is detected in the CPU 300 (hereinafter referred to as a normal state) is the path illustrated in the left-hand side, i.e., the path from the operation unit 303 to the MRF 301 through the ECC generation circuit 312, the simulated fault data generation circuit 308, the simulated fault data generation circuit 306, and the selector 313 in this described order. A part of the path also functions as a path from the operation unit 303 to the WRF 302. That is, letting the sign "P" refer to the branch point between the simulated fault data generation circuits 308 and 306 in FIG. 3, the path from the operation unit 303 to the branch point P is an overlapping part.

Thus, to write back the output data and the corresponding parity to both the MRF 301 and WRF 302, the operation unit 303 outputs the output data and the parity to the ECC generation circuit 312. The ECC generation circuit 312 receives 72 bits formed by the output data and the parity as input, generates from the 64-bit output data an 8-bit ECC corresponding to the output data, and outputs 80 bits formed by the output data, the parity, and the ECC to the simulated fault data generation circuit 308.

When the simulated fault data generation circuit 308 receives a simulated fault data generation instruction from the simulated fault occurrence control unit 307, it inverts a value of one bit among the 72 bits formed by the output data and the parity, and combines the resultant 72 bits with the 8-bit ECC input from the ECC generation circuit 312, thereby generating 80-bit simulated fault data. The simulated fault data generation circuit 308 outputs 72 bits corresponding to the output data and the parity in the generated 80-bit simulated fault data to the WRF 302, and outputs the 80-bit simulated fault data to the simulated fault data generation circuit 306.

On the other hand, when no simulated fault data generation instruction is received from the simulated fault occurrence control unit 307, the simulated fault data generation circuit 308 outputs 72 bits corresponding to the output data and the parity in the input 80 bits to the WRF 302 as they are input, and outputs the input 80 bits to the simulated fault data generation circuit 306 as they are input.

The simulated fault data generation instruction is specifically expressed by a 1-bit signal. When the 1-bit value is 0, it indicates the absence of a simulated fault data generation instruction. When it is 1, it indicates the presence of a simulated fault data generation instruction. Similarly in the explanation below, with respect to any other instructions, 0 indicates the absence of an instruction, and 1 indicates the presence of an instruction. The simulated fault data generation instruction issued by the simulated fault occurrence control unit 307 corresponds to the second generation instruction according to the first embodiment.

As described above, when a simulated fault data generation instruction is received from the simulated fault occurrence control unit 307, simulated fault data is written to the WRF 302. Therefore, a fault occurring in the WRF 302 is simulated. Accordingly, it is made possible to perform debugging for checking whether or not the operation unit 303 correctly detects an error when the simulated fault data is read to the operation unit 303 for the next or any subsequent operation.

On the other hand, as described below, a fault singly occurring in the MRF 301 can also be simulated in the present embodiment. In the simulation, simulated fault data is written to the MRF 301. In the present embodiment, it is also made possible to perform debugging as to whether or not the parity check unit 309 correctly detects an error when the simulated fault data of the MRF 301 is copied later to the WRF 302, whether or not the ECC check-correction circuit 310 correctly operates depending on the detection result, etc.

The continuing operation of the simulated fault data generation circuit 308 after the operation above is described below. The 80 bits output from the simulated fault data generation circuit 308 are input to the simulated fault data generation circuit 306. The 80 bits may be the simulated fault data generated by the simulated fault data generation circuit 308, or may be formed by the output data, the parity, and the ECC.

When the simulated fault data generation circuit 306 receives a simulated fault data generation instruction from the simulated fault occurrence control unit 305, it inverts a value (s) of one or two bits among the input 80 bits, thereby generating 80-bit simulated fault data, and outputting it to the selector 313. When no simulated fault data generation instruction is received from the simulated fault occurrence control unit 305, the simulated fault data generation circuit 306 outputs the input 80 bits to the selector 313 as they are input. The simulated fault data generation instruction issued by the simulated fault occurrence control unit 305 corresponds to the first generation instruction according to the first embodiment.

The selector 313 selects one of the output from the simulated fault data generation circuit 306 and the output from parity generation circuit 311, and provides the selected output for the MRF 301. The selector 313 is controlled by the control unit 304. The control unit 304 issues an instruction to the selector 313 to select the parity generation circuit 311 in a state in which an error is detected in the CPU 300 (hereinafter referred to as a fault detected state) and to select the simulated fault data generation circuit 306 in the normal state.

Therefore, the 80 bits output from the simulated fault data generation circuit 306 are written to the MRF 301 in the normal state. The 80 bits may be any of the following four types on condition that a case in which an actual fault occurs is ignored for simple explanation.

(1) When none of the simulated fault occurrence control units 305 and 307 has issued a simulated fault data generation instruction, the output data output from the operation unit 303 and the corresponding parity and ECC are written to the MRF 301.
(2) When the simulated fault occurrence control unit 307 issues a simulated fault data generation instruction while the simulated fault occurrence control unit 305 does not, the simulated fault data including a 1-bit simulated fault generated by the simulated fault data generation circuit 308 is written to the MRF 301.
(3) When the simulated fault occurrence control unit 307 does not issue a simulated fault data generation instruction while the simulated fault occurrence control unit 305 issues it, the simulated fault data including 1- or 2-bit simulated fault generated by the simulated fault data generation circuit 306 is written to the MRF 301.
(4) When both the simulated fault occurrence control units 305 and 307 issue a simulated fault data generation instruction, the simulated fault data including the 1-bit simulated fault generated by the simulated fault data generation circuit 308 and the 1- or 2-bit simulated fault generated by the simulated fault data generation circuit 306 is written to the MRF 301.

However, in the present embodiment, the control unit 304 performs control so as to prevent the case (4) because simulated fault data including a 3-bit simulated fault, which is unexpected to be detected, may be written to the MRF 301 in the case (4). Described below are the control by the control unit 304 and the operations of the simulated fault occurrence control units 305 and 307.

The control unit 304 issues, to the MRF 301, the WRF 302, and the simulated fault occurrence control units 305 and 307, a write instruction to write output data output from the operation unit 303 to both the MRF 301 and the WRF 302. The reasons for an issue of a write instruction to the simulated fault occurrence control units 305 and 307 are that a timing notification for generating a simulated fault is to be issued and that the frequency of occurrences of simulated faults is to be adjusted. Although described later in detail, in the second embodiment, the frequency of occurrences of simulated faults is adjusted by specifying the ratio with respect to the number of times the write instruction is issued.

The control unit 304 issues, to each of the simulated fault occurrence control units 305 and 307, a 1-bit simulated fault occurrence instruction to make a simulated fault occur. The simulated fault occurrence instructions to the simulated fault occurrence control units 305 and 307 respectively correspond to the first and second occurrence instructions according to the first embodiment. In the second embodiment, the control unit 304 operates to issue a simulated fault occurrence instruction to at most one of the simulated fault occurrence control units 305 and 307 in order to prevent the above-mentioned case (4).

Furthermore, the control unit 304 outputs a simulated fault frequency selection signal for selection of the frequency of occurrences of simulated faults to each of the simulated fault occurrence control units 305 and 307 independently. The simulated fault frequency selection signal is a signal for adjustment of the frequency of issuing simulated fault data generation instructions by the simulated fault occurrence control units 305 and 307.

The control unit 304 also outputs, to the simulated fault data generation circuit 306, a simulated fault bit selection signal for specification as to whether to make a simulated fault occur in 1 bit or 2 bits.

When the control unit 304 issues a simulated fault occurrence instruction, the simulated fault occurrence control unit 305 issues a simulated fault data generation instruction to the simulated fault data generation circuit 306 at the frequency specified by the simulated fault frequency selection signal provided by the control unit 304. The operation of the simulated fault data generation circuit 306 is described above.

Similarly, when the control unit 304 issues a simulated fault occurrence instruction, the simulated fault occurrence control unit 307 issues a simulated fault data generation instruction to the simulated fault data generation circuit 308 at the frequency specified by the simulated fault frequency selection signal provided by the control unit 304. The operation of the simulated fault data generation circuit 308 is described above.

That is, the operations of the simulated fault data generation circuits 306 and 308 are directly controlled by the simulated fault occurrence control units 305 and 307, respectively, while they are indirectly controlled by the control unit 304.

Next, the reason why it is preferable that the frequency of occurrences of simulated faults is adjusted as described above is described. The CPU 300 has various mechanisms to be debugged including those omitted in FIG. 3. When any of the mechanisms to be debugged detects an occurrence of a fault from an error of data, an automatic instruction rerun by hardware, an exception handling by a software interrupt, or the like is performed.

Generally, when the frequency of occurrences of faults (errors) is low, the execution of a program is continued by rerunning an instruction by hardware. However, when the frequency of occurrences of faults becomes high, the hardware becomes unable to cope with them and the tendency for interrupt handling by software to occur increases. Thus, the types of operations to be performed depend on the frequency of occurrences of faults, and a unit to perform the operation also depends on the frequency. Therefore, it is necessary to perform debugging as to whether or not various mechanisms to be debugged appropriately operate depending on the frequency of occurrences of faults.

However, in the circuit in FIG. 1, the frequency of occurrences of simulated faults cannot be controlled. Therefore, in the second embodiment, the frequency of occurrences of simulated faults is controlled to solve the problem in FIG. 1. A specific example of control is described later with reference to FIG. 4.

Described next is how the generated simulated fault data is used. As described with reference to the first embodiment, either the normal mode or the debug mode is also set for the CPU 300 according to the second embodiment. On the other hand, independent of the switchover between the modes, there are two states for the CPU 300, that is, the normal state and the fault detected state.

The simulated fault data generated by the simulated fault data generation circuit 308 or 306 as described above is used for debugging for verifying that various mechanisms to be debugged appropriately operate. Specifically, it is verified whether or not the normal state appropriately changes to the fault detected state, and whether or not an appropriate correction is performed in the fault detected state resulting in a recovery to the normal state. That is, in the second embodiment, it is verified whether or not the following operations are performed on the simulated fault data.

When the simulated fault data stored in the MRF 301 is read out to the WRF 302, the parity check unit 309 detects that the input from the MRF 301 includes an error. Or, when the simulated fault data stored in the WRF 302 is read out to the operation unit 303, the operation unit 303 checks the parity, and detects that the input from the WRF 302 includes an error.

Thus, if any of the mechanisms to be debugged detects an error, the mechanism to be debugged that has detected the error notifies the control unit 304 of the detection of the error. The notification may include the information for identifying an entry in which the error has been detected. For example, when the parity check unit 309 detects an error in the MRF 301, the notification includes the information for identification of an entry in the MRF 301. Upon the notification, the control unit 304 recognizes the transition from the normal state to the fault detected state, notifies each unit in the CPU 300 of the transition to the fault detected state, and controls each unit to temporarily suspend the process.

Upon the transition to the fault detected state, the process of correcting an error by the ECC held in the MRF 301 is started according to an instruction from the control unit 304. That is, data in the 0th through 63rd bits and an ECC in the 72nd through 79th bits are read out to the WRF 302 from the entry of the MRF 301 containing the data to be corrected.

In the reading operation, the control unit 304 specifies the entry of the MRF 301 including the data to be corrected. The specification is feasible because when an error in the MRF 301 is detected, the information for identification of an entry of the MRF 301 is contained in the notification from the parity check unit 309 to the control unit 304 as described above; and because when an error is detected in a component other than the MRF 301, the control unit 304 also recognizes the entry of the MRF 301 corresponding to the data in which the error is detected.

The parity check unit 309 checks the parity in the normal state, but outputs the input as is in the fault detected state. Therefore, the data and the ECC are read out to the WRF 302 from the MRF 301 through the parity check unit 309 as in the normal state.

As described above, since each entry of the WRF 302 is formed by 72 bits, it is capable of storing 72 bits that are data and ECC. The data and ECC read out to the WRF 302 is output to the ECC check-correction circuit 310 through the operation unit 303. The ECC check-correction circuit 310 detects an error of at most 2 bits from the input data and ECC, and corrects an error of at most 1 bit.

When a 2-bit error is detected, the ECC check-correction circuit 310 cannot correct the error. In this case, for example, the ECC check-correction circuit 310 notifies the control unit 304 of the detection of the 2-bit error, and the control unit 304 generates an interrupt, thereby an interrupt handling being started for trying to recover from the error.

On the other hand, when a 1-bit error is detected, the ECC check-correction circuit 310 corrects the error, and outputs the corrected data and the corrected ECC to the parity generation circuit 311. Meanwhile, when a simulated fault is generated only in the parity, the data and the ECC do not include an error. In this case, the ECC check-correction circuit 310 does not detect any error, and outputs the input data and ECC to the parity generation circuit 311 as they are input.

The parity generation circuit 311 generates parity from the input data, and outputs 80 bits formed by data, parity, and ECC to the selector 313. The control unit 304 controls the selector 313 to select the input from the parity generation circuit 311 in the fault detected state. Therefore, the output from the parity generation circuit 311 is written to the MRF 301 through the selector 313.

In this stage, the data and the ECC are written in the WRF 302. Accordingly, the control unit 304 allows the WRF 302 to read the necessary data and parity from the MRF 301 after the corrected data, parity, and ECC are written to the MRF 301. The update of the WRF 302 causes the transition from the fault detected state to the normal state. Back in the normal state, the control unit 304 controls each unit of the CPU 300 to restart the execution of the instruction being executed when the fault is detected.

When the ECC check-correction circuit 310 detects a 2-bit error, the WRF 302 is updated after data is appropriately corrected in the interrupt handling, and the CPU 300 is recovered to the normal state.

Described above are the transition from the normal state to the fault detected state, and the recovery operation from the fault detected state to the normal state. Debugging a mechanism to be debugged includes the verification as to whether or not the above-mentioned operations are appropriately performed.

As understood by the description above, in FIG. 3, the right path in the two paths from the operation unit 303 to the MRF 301 is used only in the fault detected state, and the left path is used only in the normal state. In FIG. 3, there are three portions indicated by the description "Data+Parity or Data+ECC". The description means that data and parity are transferred in the normal state, and data and an ECC are transferred in the fault detected state.

Figure 5:
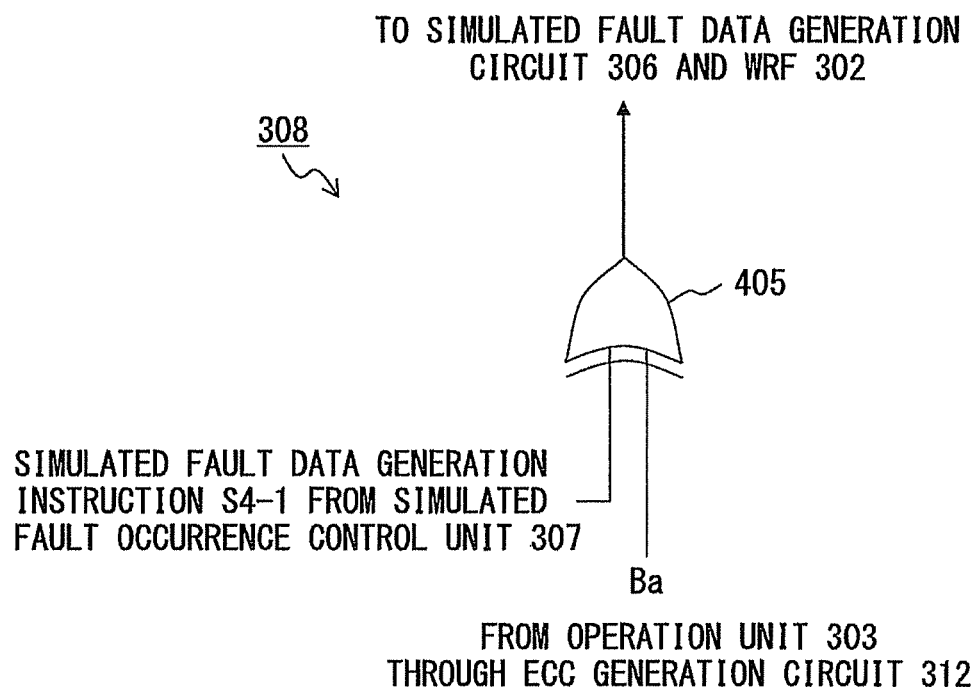
FIG. 5 is a circuit diagram illustrating a specific example of a simulated fault data generation circuit according to the second embodiment.
Figure 6:
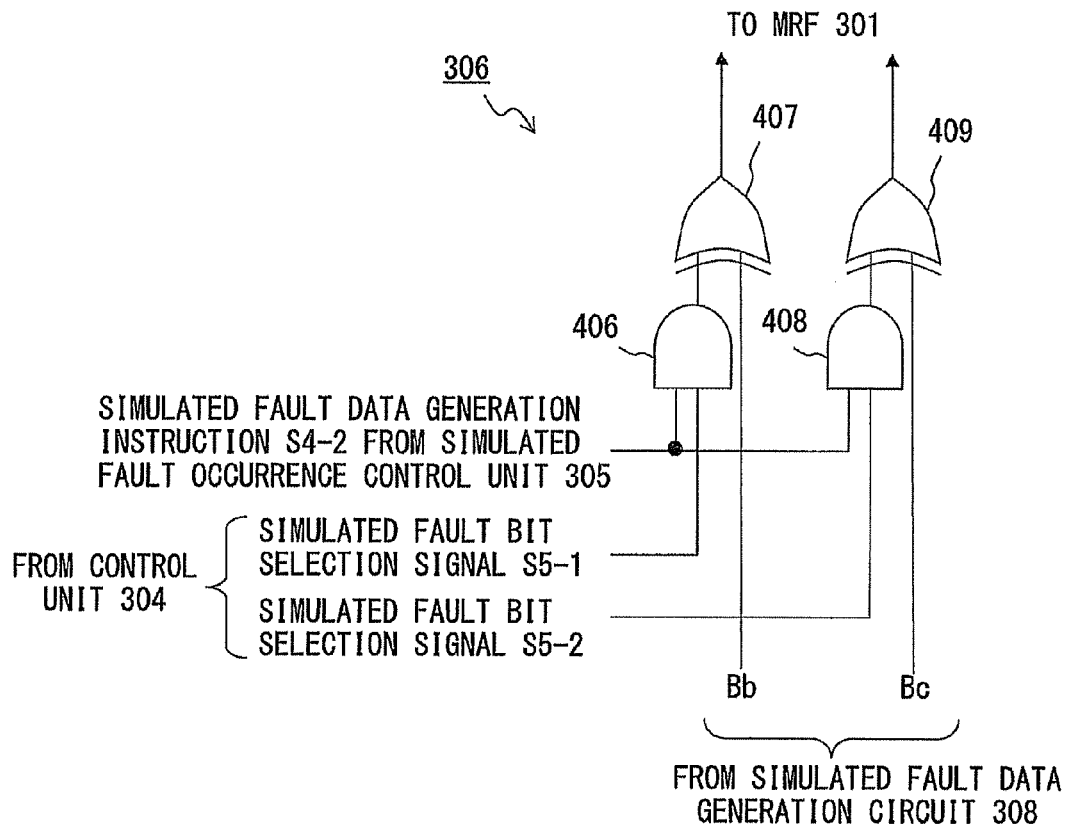
FIG. 6 is a circuit diagram illustrating a specific example of a simulated fault data generation circuit according to the second embodiment.

Next, with reference to FIGS. 4 through 6, specific examples of the simulated fault occurrence control units 305 and 307 and the simulated fault data generation circuits 306 and 308 are described. FIG. 4 is a circuit diagram illustrating a specific example of the simulated fault occurrence control units 305 and 307 in the second embodiment. In the description below the simulated fault occurrence control unit 305 is mainly described for convenience in explanation, but the simulated fault occurrence control units 305 and 307 have similar configurations in the second embodiment.

As illustrated in FIG. 4, the simulated fault occurrence control unit 305 includes an AND gate 401, a writing frequency counter 402, a decoding circuit 403, and a selector 404. What are input to the simulated fault occurrence control unit 305 are a 1-bit write instruction S1, a 1-bit simulated fault occurrence instruction S2, and m-bit simulated fault frequency selection signal S3. These three pieces of input data are provided from the control unit 304. The input to the simulated fault occurrence control unit 307 is similarly provided. The output from the simulated fault occurrence control unit 305 is a 1-bit simulated fault data generation instruction S4, and is output to the simulated fault data generation circuit 306. On the other hand, the simulated fault occurrence control unit 307 outputs the simulated fault data generation instruction S4 to the simulated fault data generation circuit 308. The "m" is an integer of 1 or more defined depending on the configuration of the decoding circuit 403.

The write instruction S1 is input to both the AND gate 401 and the writing frequency counter 402. The writing frequency counter 402 is a counter to count the number of times that a writing operation to the MRF 301 and the WRF 302 is performed by incrementing its value by 1 each time the write instruction S1 is issued, that is, each time the write instruction S1 indicates 1. The value held by the writing frequency counter 402 is referred to as a "counter value", and referenced by the sign "C".

The counter value C is output to the decoding circuit 403, and the decoding circuit decodes the counter value C to generate n signals. The "n" is an integer of 2 or more. The n signals are referred to as "frequency signals" in the description below, and referenced by the signs "F1" through "Fn". Each frequency signal Fj ($1 \leq j \leq n$) is a 1-bit signal. Each of the frequency signals F1 through Fn indicates 1 each time its own predetermined writing frequency is reached. The selector 404 selects any of the frequency signals F1 through Fn according to the simulated fault frequency selection signal S3, and outputs the selected frequency signal to the AND gate 401.

The output from the selector 404, the write instruction S1, and the simulated fault occurrence instruction S2 are input to the AND gate 401. The AND gate 401 outputs the logical conjunction (AND) of these three pieces of input data as the simulated fault data generation instruction S4 to the outside of the simulated fault occurrence control unit 305. Only when all of the frequency signal Fj selected by the simulated fault frequency selection signal S3, the write instruction S1, and the simulated fault occurrence instruction S2 indicate 1, the simulated fault data generation instruction S4 is 1, thereby allowing the simulated fault occurrence control unit 305 to instruct the simulated fault data generation circuit 306 to generate a simulated fault.

Specific description is provided exemplarily with an example in which the writing frequency counter 402 is an 8-bit counter and n=5. In this example, the counter value C takes any of the values 0 through 255, and the counter value C is updated to 0 upon the write instruction S1 becoming 1 next under the condition in which the counter value C is 255. In addition, the frequency signals F1 through F5 indicate 1 only when the counter value C is a multiple of 128, 64, 32, 16, and 8, respectively. Otherwise, they indicate 0. The decoding circuit 403 is a circuit that performs decoding as above with the counter value C as input to output five frequency signals F1 through F5.

Three bits are sufficient for the simulated fault frequency selection signal S3 because it is enough to select one of the five frequency signals F1 through F5. That is, in this example, m is 3 (m=3). The selector 404 selects the frequency signals F1, F2, F3, F4, and F5 when the simulated fault frequency selection signal S3 is 0, 1, 2, 3, and 4 respectively.

For example, in a case in which the simulated fault occurrence instruction S2 is always 1 and the simulated fault frequency selection signal S3 is always 2, the counter value C is updated each time the write instruction S1 is 1, and the frequency signal F3 is selected. That is, each time the counter value C indicates 0, 32, 64, 96, 128, 160, 192, or 224, the selector 404 outputs 1, the three pieces of input data to the AND gate 401 are all 1, and the output of the AND gate 401 is 1. In other cases, the selector 404 outputs 0, and therefore, the output of the AND gate 401 is 0. That is, in this example, each time the number of times that the write instruction S1 is issued reaches a multiple of 32, the simulated fault occurrence control unit 305 outputs the simulated fault data generation instruction S4.

Therefore, if the simulated fault occurrence instruction S2 is always set to 1, and the simulated fault frequency selection signal S3 is fixed to the value corresponding to a desired frequency, then the simulated fault occurrence control unit 305 outputs the simulated fault data generation instruction S4 at the desired frequency. When the desired frequency is changed, the value of the simulated fault frequency selection signal S3 is changed to output the simulated fault data generation instruction S4 from the simulated fault occurrence control unit 305 at the changed desired frequency.

In the above-mentioned example, the frequency signals F1 through F5 indicate 1 only when the counter value C is a multiple of 128, 64, 32, 16, and 8, respectively. The reason why the values such as 128, 64, 32, 16, 8, etc. that are powers of two are thus used as the numbers of times that the write instruction S1 is issued and that are related to the frequency signals Fj, is because it makes possible to configure the decoding circuit 403 simply. However, it is obvious that the numbers of times that the write instruction S1 is issued and that are related to the frequency signals Fj are not limited to the powers of two.

Next, a specific example of the simulated fault data generation circuit 308 in the second embodiment is described below with reference to the circuit diagram in FIG. 5. To distinguish between the simulated fault occurrence control units 305 and 307 described with reference to the same FIG. 4, the following description is made using the signs "S4-1" and "S4-2" instead of "S4" used in FIG. 4.

In the second embodiment, it is fixedly predetermined that the position of the bit whose value is inverted by the simulated fault data generation circuit 308 when the simulated fault data generation instruction S4-1 is issued from the simulated fault occurrence control unit 307 is the a-th bit. Based on the above-mentioned assumption that the data is formed by the 0th through 63rd bits, the parity is formed by the 64th through 71st bits, and the ECC is formed by the 72nd through 79th bit, the "a" herein is an integer that satisfies $0 \leq a \leq 71$. In the following description, the bit signal at the a-th bit is referred to by the sign "Ba".

The simulated fault data generation circuit 308 includes an XOR gate 405 for calculating the exclusive disjunction of the 1-bit simulated fault data generation instruction S4-1 output from the simulated fault occurrence control unit 307 and a bit signal Ba in the output from the ECC generation circuit 312. Therefore, the value of the bit signal Ba is inverted only when the simulated fault data generation instruction S4-1 is 1.

The XOR gate 405 outputs an operation result to the outside of the simulated fault data generation circuit 308. In any case, input values of the 79 bits other than the a-th bit, in the 80 bits input to the simulated fault data generation circuit 308, are output from the simulated fault data generation circuit 308 as they are. Thus, only when the simulated fault occurrence control unit 307 issues the simulated fault data generation instruction S4-1, that is, only when the simulated fault data generation instruction S4-1 is 1, the simulated fault data generation circuit 308 makes a 1-bit simulated fault occur. Otherwise, it outputs the input as is.

A specific example of the simulated fault data generation circuit 306 in the second embodiment is described next with reference to the circuit diagram in FIG. 6.

The number of bits to be inverted by the simulated fault data generation circuit 306 when the simulated fault occurrence control unit 305 issues the simulated fault data generation instruction S4-2 is 1 or 2. In the second embodiment, the position(s) of the bit(s) to be inverted is (are) fixedly determined in advance. That is, on the assumption that b and c are integers that satisfy "0≤b, c≤79", when the simulated fault data generation circuit 306 receives the simulated fault data generation instruction S4-2, it inverts either the b-th bit or the c-th bit in the input 80 bits, or inverts both of them. In the following description, the bit signals at the b-th bit and the c-th bit are referred to by the signs "Bb" and "Bc" respectively.

The simulated fault data generation circuit 306 includes two sets of an AND gate and an XOR gate. An AND gate 406 calculates the logical conjunction of the 1-bit simulated fault data generation instruction S4-2 output from the simulated fault occurrence control unit 305 and the 1-bit simulated fault bit selection signal S5-1 output from the control unit 304, and outputs an operation result to an XOR gate 407. The simulated fault bit selection signal S5-1 is a signal which indicates, when it is 1, that the b-th bit is to be inverted. The XOR gate 407 calculates the exclusive disjunction of the 1-bit signal output from the AND gate 406 and the bit signal Bb at the b-th bit in the output of the simulated fault data generation circuit 308, and outputs it to the outside of the simulated fault data generation circuit 306.

Similarly, the AND gate 408 calculates the logical conjunction of the 1-bit simulated fault data generation instruction S4-2 output from the simulated fault occurrence control unit 305 and the 1-bit simulated fault bit selection signal S5-2 output from the control unit 304, and outputs an operation result to an XOR gate 409. The simulated fault bit selection signal S5-2 is a signal which indicates, when it is 1, that the c-th bit is to be inverted. The XOR gate 409 calculates the exclusive disjunction of the 1-bit signal output from the AND gate 408 and the bit signal Bc at the c-th bit in the output of the simulated fault data generation circuit 308, and outputs it to the outside of the simulated fault data generation circuit 306.

In the second embodiment, the control unit 304 operates in such a way that it sets the value of at least one of the simulated fault bit selection signals S5-1 and S5-2 to be 1 whenever it issues the simulated fault data generation instruction S4-2. In any case, input values of the 78 bits other than the b-th bit and the c-th bit, in the 80 bits input to the simulated fault data generation circuit 306, are output from the simulated fault data generation circuit 306 as they are.

That is, when the simulated fault occurrence control unit 305 does not issue the simulated fault data generation instruction S4-2, that is, when the simulated fault data generation instruction S4-2 is 0, the simulated fault data generation circuit 306 outputs the input as is. On the other hand, when the simulated fault occurrence control unit 305 issues the simulated fault data generation instruction S4-2, the simulated fault data generation circuit 306 makes a simulated fault occur in the b-th bit only, the c-th bit only, or both of the b-th and c-th bits depending on the values of the simulated fault bit selection signals S5-1 and S5-2. Thus, on the basis of the control by the control unit 304, simulated fault data including 1- or 2-bit simulated fault is generated. In the second embodiment, both the number and the position(s) of bit(s) to be inverted by the simulated fault data generation circuit 306 are specified by the simulated fault bit selection signals S5-1 and S5-2.

Described above in detail is the second embodiment which also has the following effects.

The first effect is, similarly to the first embodiment, the ability to write normal output data and parity to the WRF 302 as they are, and to write simulated fault data only to the MRF 301. This makes it possible to efficiently debug the parity check unit 309 and the ECC check-correction circuit 310.

Debugging the parity check unit 309 is to verify whether or not the checking operation performed by the parity check unit 309 when data is read from the MRF 301 to the WRF 302 is normal. Debugging the ECC check-correction circuit 310 is to verify whether or not, when an error to be detected is appropriately detected by a normal checking operation of the parity check unit 309, the ECC check-correction circuit 310 is able to use the detection as a trigger and to correctly correct data according to an ECC.

As before, it is also possible to simulate a pattern in which the same faults simultaneously occur in both the MRF 301 and the WRF 302. Therefore, the first effect may be paraphrased that simulatable patterns of occurrences of faults are expanded. That is, in the second embodiment, the control unit 304 does not issue a simulated fault occurrence instruction to the simulated fault occurrence control unit 305, but issues the simulated fault occurrence instruction only to the simulated fault occurrence control unit 307, thereby making it possible to easily simulate a pattern in which the same faults occur simultaneously in both the MRF 301 and the WRF 302.

The second effect lies in that the frequency of occurrences of simulated faults is controlled so as to be variable in each of the simulated fault occurrence control units 305 and 307. This makes it easier to debug a plurality of processes performed when a fault is detected.

Generally, plural types of processes, such as a process by a hardware-realized mechanism to be debugged and a process by a software-realized mechanism to be debugged, are switched therebetween or used in combination depending on the frequency of occurrences of faults. In the second embodiment, simulated faults are made possible to occur at a desired frequency easily only by setting two simulated fault frequency selection signals issued by the control unit 304 in conformity with the desired frequency. Therefore, it is easily verified whether or not the above-mentioned plurality of processes are appropriately switched or combined. It is also easy to simulate that faults occur in the MRF 301 and the WRF 302 at different frequencies as in the reality.

The third effect is the ability to efficiently debug only the portions related to an ECC, conforming to the adoption of the ECC only in the MRF 301. For example, setting the b-th bit and the c-th bit described with reference to FIG. 6 so that "72≤b, c≤79" holds enables simulated faults to occur only in a portion of an ECC. It is also possible to make a 2-bit simulated fault occur only in the MRF 301 without making it occur in the WRF 302.

The fourth effect is a good balance between data reliability and a circuit size. The data reliability in the MRF 301 is higher than before since the MRF 301 holds parity and an ECC, and correspondingly, the ECC check-correction circuit 310, the parity generation circuit 311, and the ECC generation circuit 312 are provided. On the other hand, an unnecessary increase in a circuit size is prevented by not adopting an ECC but by adopting only the parity in the WRF 302 in which the frequency of occurrences of faults such as soft errors is lower than that in the MRF 301. Therefore, a balance between the data reliability and the circuit size in the entire CPU 300 is good.

The fifth effect is to suppress the entire circuit size of the CPU 300 by sharing the circuit and the wiring. For example, as described above, the WRF 302 may store 72 bits formed by data and parity, or 72 bits formed by data and an ECC; and the same storage area is shared by a plurality of uses. The reason why the data and the ECC are thus transmitted to the ECC check-correction circuit 310 through the WRF 302 and the operation unit 303 when a correction is to be made using an ECC is because it allows an existing data transfer path to be efficiently used and it prevent new wiring from being prepared. In addition, unnecessary wiring is prevented by partially sharing the path from the operation unit 303 to the WRF 302 through the simulated fault data generation circuit 308 and the path from the operation unit 303 to the MRF 301 through the simulated fault data generation circuit 306. As a result, the entire circuit size of the CPU 300 is suppressed.

The present invention is not limited to the above-mentioned embodiments, but may be modified in various ways. Some examples are described below.

FIGS. 2 and 3 illustrate similar components, but the connections between the components are different between FIGS. 2 and 3. As clearly indicated by this, it is possible to change the specific connections between the components according to an embodiment. For example, in FIG. 3, the simulated fault data generation circuit 308 may be moved to between the branch point P and the WRF 302.

With respect to various instructions in the above-mentioned embodiments, it is assumed that "0" refers to "no instruction is issued", and that "1" refers to "an instruction is issued". However, depending on the embodiments, the meanings of 0 and 1 may be reversed. In this case, the circuits in FIGS. 4 through 6 may be changed as necessary.

Furthermore, it is not essential to use an ECC as in the second embodiment, and it is possible to arbitrarily select the type of the ECC when the ECC is used. An ECC other than the SECDED, for example, an ECC for detecting an error of at most 3 bits may be used in the MRF 301. Additionally, the numbers of bits of data, parity and an ECC depend on the embodiments.

The above-mentioned first or second embodiment may be modified as follows depending on the type of error detection code to be used. That is, assuming that d is 1 or more, an error detection code capable of detecting an error of at most d bits is used in the first register file 201 illustrated in FIG. 2 or in the MRF 301 illustrated in FIG. 3. Then, the first generation unit 206 in FIG. 2 or the simulated fault data generation circuit 306 in FIG. 3 receives at least output data and an error detection code as input, and inverts a bit(s) less than or equal to d bits in the input, thereby generating first simulated fault data. In this case, the first generation unit 206 in FIG. 2 or the simulated fault data generation circuit 306 in FIG. 3 may further receive a bit selection instruction specifying the number x which is equal to or larger than 1 and equal to or smaller than d, and may invert the x bits in the input. In the second embodiment, as illustrated in FIG. 6, d is 2 (d=2), and it is specified by the simulated fault bit selection signals S5-1 and S5-2 that x=1 or x=2. However, the bit selection instruction may be given in a format different from that illustrated in FIG. 6.

In the second embodiment, the position(s) of the bit(s) to make a simulated fault(s) occur is(are) fixedly predetermined in either the simulated fault data generation circuit 308 or 306. However, the position(s) of the bit(s) to make the simulated fault(s) occur may be variable.

For example, the control unit 304 may issue a bit position specifying instruction to the simulated fault data generation circuit 306, and the simulated fault data generation circuit 306 may invert the value(s) of the bit(s) of one or two positions indicated by the bit position specifying instruction. In FIG. 6, two sets of an AND gate and an XOR gate are illustrated corresponding to the two simulated fault bit selection signals S5-1 and S5-2 while a simulated fault may be made to occur at any position in the 80 bits by providing 80 sets of the AND gate and the XOR gate. To do this, the bit position specifying instruction may be expressed by 80 bits in which only one or two bits indicate 1, and other bits indicate 0. The position(s) of the bit(s) to make a simulated fault(s) occur is (are) may be made variable with the configurations other than the above-mentioned configuration.

A mechanism to be debugged, which is a debugging target, is not limited to those exemplified in the above-mentioned embodiments.

In the second embodiment, the control unit 304 controls the simulated fault occurrence control units 305 and 307 to prevent a case in which both of them issue a simulated fault data generation instruction, but a different control method may be used.

For example, depending on the embodiments, whenever the control unit 304 issues simulated fault occurrence instructions to both of the simulated fault occurrence control units 305 and 307, it issues a simulated fault bit selection signal to the simulated fault data generation circuit 306 so that a simulated fault is made to occur only in one bit. This makes it possible, even when both of the simulated fault occurrence control units 305 and 307 issue the simulated fault data generation instruction, to prevent a simulated fault of three or more bits that is not expected as a target of detection from occurring. Therefore, it is possible to efficiently debug the mechanism to be debugged.

In the second embodiment, the frequency of occurrences of simulated faults is adjusted by specifying the ratio with respect to the number of times a write instruction is issued. To attain this, the circuit configuration illustrated in FIG. 4 is used. However, a manner to adjust the frequency is not limited to the above-mentioned example. For example, some embodiments may adjust the frequency of occurrences of simulated faults by specifying the ratio with respect to the number of clocks, thereby making simulated faults occur at a specified time interval.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing apparatus comprising:
   a first register file;
   a second register file configured to hold a part of data held in the first register file;
   an operation unit configured
   to perform an operation using data in the second register file, and to output an operation result as output data;
an instruction unit configured to issue
a write instruction to write the output data and an error detection code for detection of an error in the output data to both the first register file and the second register file,
a first occurrence instruction to generate a simulated fault in the first register file, and
a second occurrence instruction to generate a simulated fault in the second register file;
a first control unit configured to issue a first generation instruction upon receipt of the write instruction and the first occurrence instruction;
a first generation unit configured
to receive object data that is input to the first generation unit,
to generate first simulated fault data according to the object upon receipt of the first generation instruction,
to output the first simulated fault data to the first register file upon generation of the first simulated fault data, and
to output the object data to the first register file in absence of the first generation instruction;
a second control unit configured to issue a second generation instruction upon receipt of the write instruction and the second occurrence instruction; and
a second generation unit configured
to receive the output data and the error detection code,
to generate second simulated fault data according to the received output data and the received error detection code upon receipt of the second generation instruction,
to output the second simulated fault data to the first generation unit as the object data and to the second register file upon generation of the second simulated fault data, and
to output the received output data and the received error detection code to the first generation unit as the object data and to the second register file in absence of the second generation instruction.

2. The processing apparatus according to claim 1, wherein the first control unit further receives a first frequency selection instruction to specify a first frequency at which the first generation instruction is issued, and adjusts the first frequency in accordance with the first frequency selection instruction.

3. The processing apparatus according to claim 2, wherein:
the first frequency selection instruction is an instruction which selects one of a plurality of options indicating numbers of times the write instruction is issued;
the first control unit adjusts the first frequency by issuing the first generation instruction when a number of times the write instruction is issued reaches the number of times corresponding to the selected option and when the first occurrence instruction is received.

4. The processing apparatus according to claim 1, wherein the second control unit further receives a second frequency selection instruction to specify a second frequency at which the second generation instruction is issued, and adjusts the second frequency in accordance with the second frequency selection instruction.

5. The processing apparatus according to claim 4, wherein:
the second frequency selection instruction is an instruction which selects one of a plurality of options indicating numbers of times the write instruction is issued;
the second control unit adjusts the second frequency by issuing the second generation instruction when a number of times the write instruction is issued reaches the number of times corresponding to the selected option and when the second occurrence instruction is received.

6. The processing apparatus according to claim 1, wherein:
an upper limit of a number of bits in which an error is detectable in the first register file is d that is larger than or equal to 1; and
the first generation unit receives at least the output data and the error detection code as input, and generates the first simulated fault data by inverting d bits or less in the input.

7. The processing apparatus according to claim 6, wherein the first generation unit further receives a bit selection instruction to specify a number x that is equal to or larger than 1 and equal to or smaller than d and that is a number of bits to be inverted by the first generation unit.

8. The processing apparatus according to claim 7, wherein the bit selection instruction is an instruction which selects x bits from among particular d bits whose positions are determined.

9. The processing apparatus according to claim 6, wherein:
the error detection code is a type of code unable to correct an error; and
the first generation unit also receives an error correction code generated from the output data as input, and generates the first simulated fault data by inverting d bits or less from among the output data, the error detection code, and the error correction code.

10. The processing apparatus according to claim 9, further comprising
an error correction unit configured to correct the first simulated fault data that is output from the first generation unit and stored in the first register file according to the error correction code.

11. The processing apparatus according to claim 1, wherein
a part of a path from the operation unit to the first register file through the first generation unit and a part of a path from the operation unit to the second register file through the second generation unit are shared.

12. The processing apparatus according to claim 11, wherein
the second generation unit is on a path connecting the operation unit and the first generation unit.

13. The processing apparatus according to claim 1, further comprising:
a third control unit configured to copy both data and an error detection code that are held by each of at least one of a plurality of first registers included in the first register file to at least one of a plurality of second registers included in the second register file.

14. A control method for controlling generation of simulated faults by a processing apparatus that includes a first register file and a second register file holding a part of data held in the first register file, the control method comprising:
performing an operation using data in the second register file;
outputting an operation result as output data;
issuing a write instruction to write the output data and an error detection code for detection of an error in the output data to both the first register file and the second register file;
issuing a first occurrence instruction to generate a simulated fault in the first register file;
generating first simulated fault data according to object data;

outputting the first simulated fault data to the first register file when the first simulated fault data is generated;

outputting the object data to the first register file when the write instruction is issued without the first occurrence instruction;

issuing a second occurrence instruction to generate a simulated fault in the second register file;

receiving the output data and the error detection code;

generating second simulated fault data according to the received output data and the received error detection code;

outputting the second simulated fault data as the object data and outputting the second simulated fault data to the second register file, when both of the write instruction and the second occurrence instruction are issued; and outputting the received output data and the received error detection code as the object data and outputting the received output data and the received error detection code to the second register file, when the write instruction is issued without the second occurrence instruction.

* * * * *

UNITED STATES PATENT AND TRADEMARK OFFICE
CERTIFICATE OF CORRECTION

| | |
|---|---|
| PATENT NO. | : 8,621,281 B2 |
| APPLICATION NO. | : 12/635896 |
| DATED | : December 31, 2013 |
| INVENTOR(S) | : Kan |

Page 1 of 1

It is certified that error appears in the above-identified patent and that said Letters Patent is hereby corrected as shown below:

In the Claims

In Column 19, Line 18, In Claim 1, after "object" insert -- data --.

Signed and Sealed this
Twenty-ninth Day of April, 2014

Michelle K. Lee
*Deputy Director of the United States Patent and Trademark Office*